(12) United States Patent
Tavano

(10) Patent No.: US 6,279,596 B1
(45) Date of Patent: Aug. 28, 2001

(54) IMPACT RESPONSIVE SAFETY SHUT-OFF FOR VEHICLES

(76) Inventor: John B. Tavano, 28 Edgewood Dr., Torrington, CT (US) 06790

( * ) Notice: Subject to any disclaimer, the term of this patent is extended or adjusted under 35 U.S.C. 154(b) by 0 days.

(21) Appl. No.: 09/453,646

(22) Filed: Dec. 3, 1999

(51) Int. Cl.[7] .................................................. G03B 27/00
(52) U.S. Cl. .............................. 137/38; 137/39; 137/45; 137/351; 137/354
(58) Field of Search .................................. 137/38, 39, 45, 137/351, 354

(56) References Cited

U.S. PATENT DOCUMENTS

| | | | |
|---|---|---|---|
| 3,840,036 | * 10/1974 | Renk | 137/38 |
| 3,888,271 | * 6/1975 | Pettit | 137/45 |
| 4,960,145 | * 10/1990 | Schlotzhauer | 137/38 |
| 6,148,849 | * 11/2000 | Green et al. | 137/351 |

* cited by examiner

*Primary Examiner*—A. Michael Chambers
*Assistant Examiner*—Thomas L. McShane
(74) *Attorney, Agent, or Firm*—McCormick, Paulding & Huber LLP

(57) ABSTRACT

In a vehicle, a housing has a weight that is normally centered by springs that yield to impact force components in several directions. This movement of the weight causes closing of fuel valves and opening of electrical switches that reduce the likelihood of fire or explosion in an accident.

7 Claims, 4 Drawing Sheets

IMPACT RESPONSIVE SAFETY SHUT-OFF FOR VEHICLES

BACKGROUND OF THE INVENTION

This invention relates generally to safety shut-off systems for motor vehicles, airplanes and any powered vehicle of the type adapted to carry at least one person. More specifically, the present invention relates to an impact responsive control system for shutting off the fuel and the electricity to a motor vehicle in order to reduce the likelihood of fire or explosion when the vehicle is involved in an accident situation.

CROSS REFERENCE

The following patents are incorporated by reference herein: U.S. Pat. No. 5,738,304 issued Apr. 14, 1998 and entitled Emergency Aircraft Fuel System. U.S. Pat. No. 4,784,354 issued Nov. 15, 1999 also entitled Emergency Aircraft Fuel System.

FIELD OF THE INVENTION

Inertia operated safety devices for vehicles are well known. Such a device is disclosed in U.S. Pat. No. 3,840,036 dated Oct. 8, 1974 wherein a magnetic field is set up between two plates that are normally spaced apart, but which come together in the event of impact where the plates are held in contact by magnetic attraction. This attraction continues after the impact to maintain a fuel shut-off valve in the closed condition, and to also achieve opening of an electrical circuit.

In accordance with present invention a multi-directional inertia device is provided without the need for magnetic attraction as in the above-mentioned patent, and the present device achieves both the shut off of a fuel line, and disabling of the vehicle's electrical system.

The general object of the present invention is to provide a unit which when properly installed in a vehicle offers significant protection against fires, explosions and electrical fire caused by head-on collision, side impact, and any other conditions that occur all too often on America's present day highway system. The advantages can also be realized in other vehicles such as boats and airplanes.

SUMMARY OF THE INVENTION

The present invention is intended for use in a vehicle having fuel lines for delivering ignitable fuel to an engine, as well as an electrical system having branch circuits that include electrical wiring in close proximity to these fuel lines and to the engine itself. For example the ignition wiring in most automotive vehicles generally derives its electrical input from the vehicles electrical system, and is necessarily provided in close proximity to the engine itself.

In accordance with present invention, a control box or housing has electrical connections for the vehicle's electrical system, and further the housing includes fuel inlet and outlet connections for connection to the vehicle's fuel lines. Electrical switches are provided in the housing for normally closing the electrical system circuit until and unless an impact should occur. These switches are provided in electrical series with one another so that activating any one of said switches disables the electrical system.

Fuel valves are provided in the housing as well for normally allowing fuel to flow through the fuel lines which are connected to the housing. These valves are provided in series with one another so that activating either of the valves interrupts fuel flow in the vehicle fuel lines.

A bi-directional inertia responsive means is provided for activating the switches and the valves, and the presently preferred form for this inertia responsive means includes a single mass in the form of rectangular block that is movable on a horizontal surface provided for this purpose in the housing. Means is provided for biasing this mass in primary longitudinal direction corresponding to the longitudinal direction of the vehicle so that an impact force with a component of pre-determined magnitude that is in said one direction overcomes the biasing force and activates at least one electrical switch and at least one valve.

The mass is also likely biased in both lateral directions, that is transversly of the primary longitudinal direction so that a lesser lateral component of any impact force on the vehicle will activate at least one electrical switch independently of the above described component of force in the longitudinal direction.

In this presently preferred form the mass is restrained by a threaded shaft oriented in the longitudinal direction at least in under normal conditions, and the biasing means preferably is in the form of coiled compression spring acting between the shaft and an abutment provided in the housing. The abutment will allow the shaft to swing in pendulum fashion but in a horizontal plane, and to allow for longitudinal movement of the mass in response to an impact on the vehicle's longitudinal axis.

The two valves are normally held open by gas pressure from a source of pressure independent of the housing, and the valves are mechanically activated so as to be movable from a normal open condition under the pressure of the gas, which gas pressure can be overridden by action of a mechanical linkage and a connecting inertial mass with the mechanically activated valve itself. The mechanical linkage is also provided for activating one or both of the switches to affect shut off of the vehicle's electrical system under either a lateral impact of relatively low magnitude or a head-on impact of somewhat greater magnitude.

DETAILED DESCRIPTION

Figure 1:
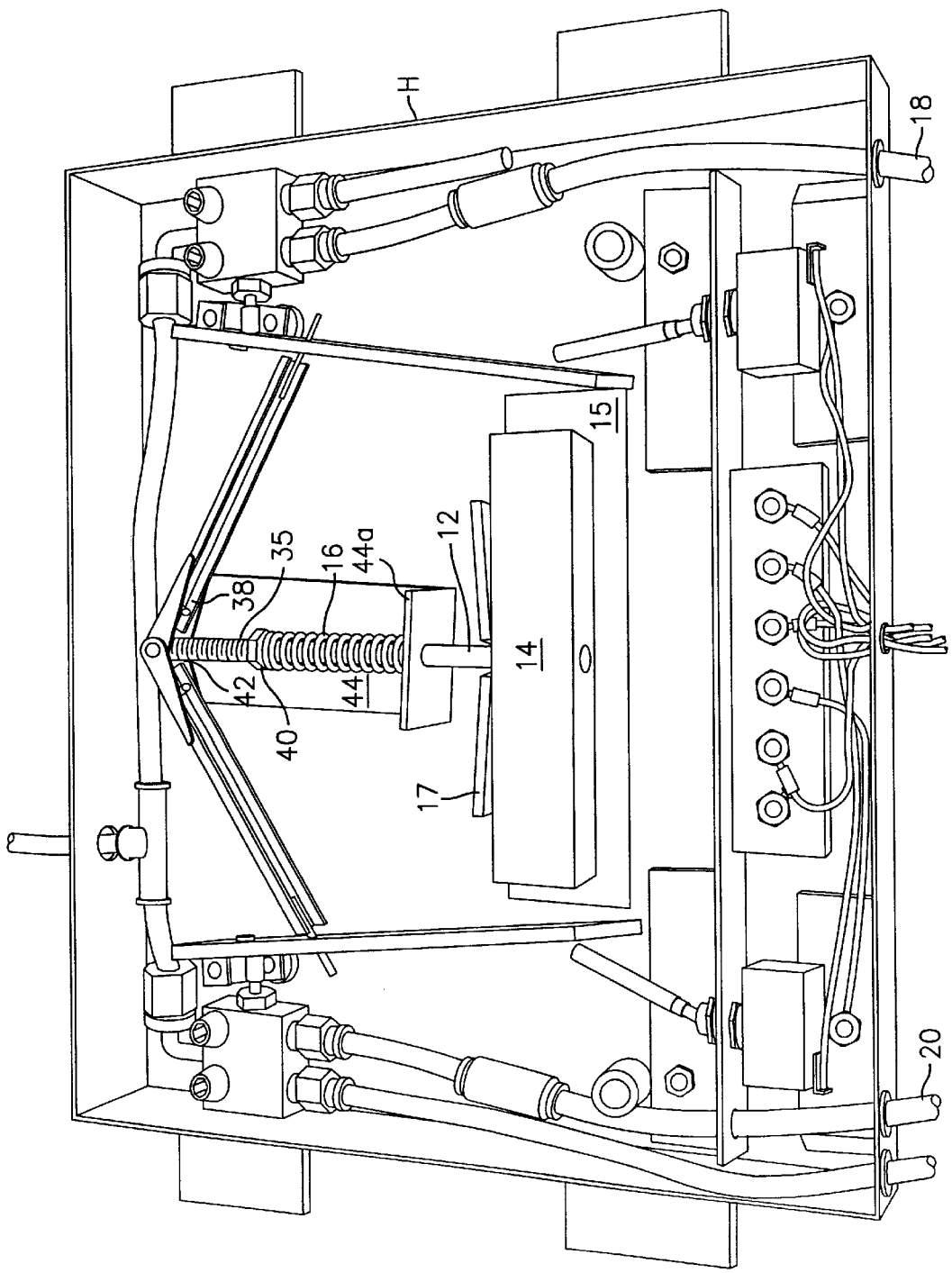
FIG. 1 is a quartering top rearward looking view of a device incorporating the invention. The vertical centerline can be taken as the longitudinal direction of a vehicle equipped with this device.

Turning now to the drawings in greater detail, FIG. 1 shows a housing H of generally rectangular configuration, and with mounting brackets B, B suitable for securing the housing to a vehicle (not shown). Preferably, the housing H would be secured to a vehicle so that the longitudinal centerline of the vehicle would be oriented parallel to and preferably on the longitudinal axis of the shaft 12 supported in the housing H in a manner to be described.

Bi-directional inertia responsive means 14 is provided in the form of rectangular block or mass 14 which is movable against the force of compression spring 16 provided on the shaft 12. In response to a head-on impact or component of force in the longitudinal direction the mass 14 can overcome the bias of spring 12 to move downwardly in FIG. 1. The mass 14 is also movable horizontally in one and an opposite lateral direction as suggested in FIGS. 2 and 3 in response to a side impact or lateral component of force due to an impact to the side vehicle, and hence to the housing in which the vehicle is mounted.

The spring 16 provides a convenient biasing means for holding the mass or block 14 in the position shown in FIG. 1. The mass can move in the longitudinal direction downwardly as suggested by the arrow A in FIG. 4 in response to an impact force on the vehicle and hence on the housing in an opposite direction.

Fuel lines 18 and 20 are routed through the housing H, and communicate with valves 22 and 24 provided in the housing as shown. These valves 22 and 24 are held in open condition by gas pressure from the line 26, which line 26 communicates with a source of gas under pressure, as for example air pressure generated by a pump driven by the engine. In some engines, the engine that operates the vehicle may also provide this pressure.

Each of these valves 22 and 24 includes an internal spool or plunger that is normally held by gas pressure in a position to hold the valve open, and therefore causing fuel to flow through the lines 18 and 20 between the fuel tank of the vehicle and the engine or more particularly the fuel delivery system associated with the engine.

Each of the valves 22 and 24 further includes a short lever arm, 23 and 25 respectively, which lever is in turn directly connected to an elongated lever, 28 and 30 respectively, which levers serve a function to be described below.

Also provided in the housing H, and preferably in a separate compartment from the fuel valves and the inertia operating mechanism, is an electrical bus that provides a convenient series of terminals T, T to which the electrical lines from the vehicle's electrical system can be connected as shown at 32, 32. Thus, the bus will serve to connect such of the terminals as will provide a continuous circuit for each of the several wires indicated in the drawings. One of these wires may be for example a ground line, another wire the electrical line which operates the vehicle's lighting system, and still another wire serves to provide electrical energy for the vehicle's ignition system.

Each of these wires 32 is connected through a plurality of switches S, S. Two such switches are arranged in electrical series with one another so that both switches must be closed in order to properly operate the vehicle's electrical circuitry. Each switch S comprises a bat or toggle-type switch having an elongated actuator portion, and each of the switches S preferably comprises a two position (on/off) switch that is so oriented in the housing as to present the toggle actuator or bat for engagement by the above-mentioned levers 28 and 30.

The bi-directional inertia responsive means or mechanism comprises the mass in the form of rectangular block 14 and its supporting structure which is designed to cause movement of the levers 28 and 30 for closing the valves and opening the electrical switches in response to either a head-on impact force or a laterally directed force of somewhat lesser magnitude when the vehicle is subjected to an accident situation.

Figure 2:
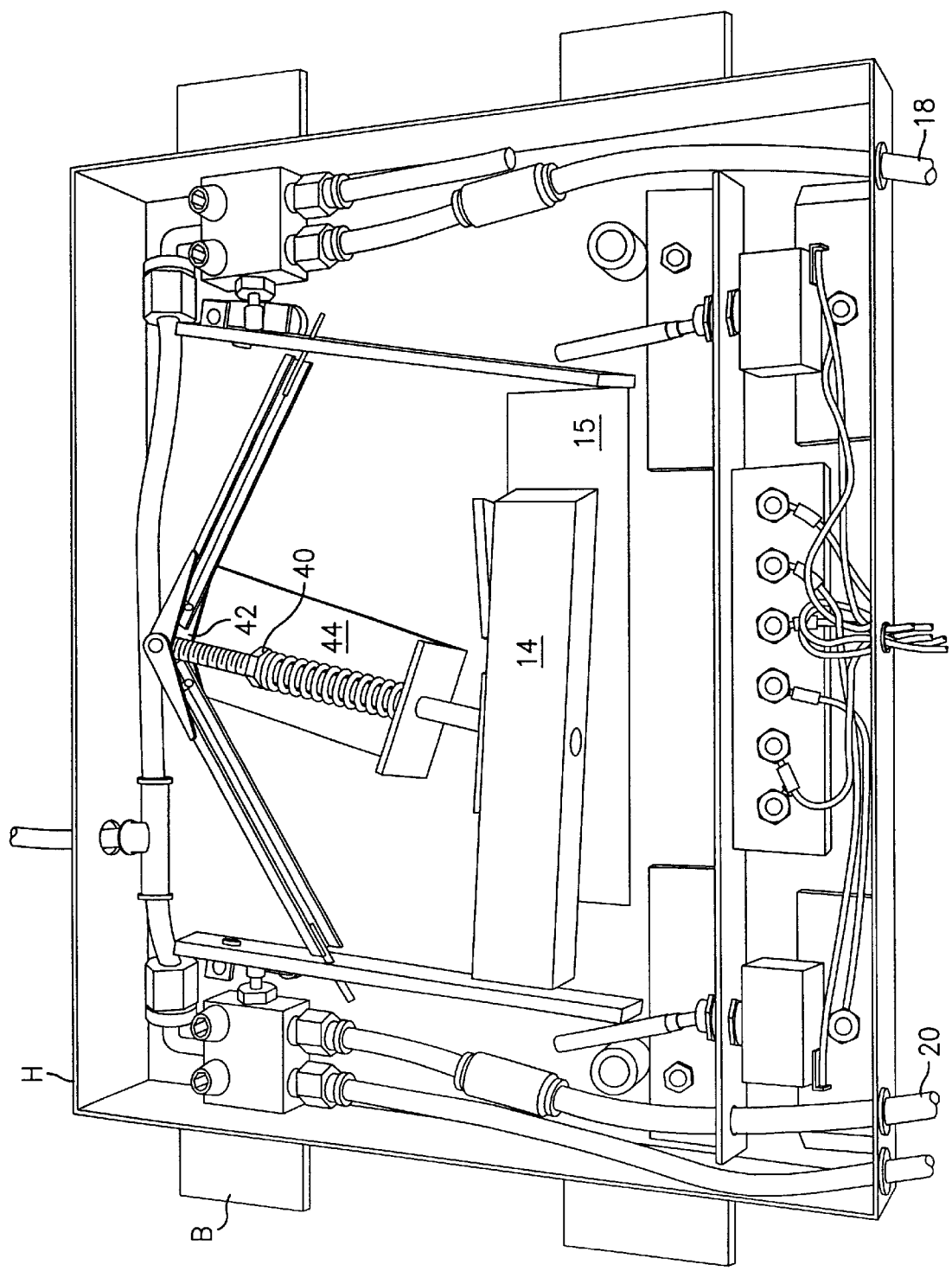
FIG. 2 is a view similar to FIG. 1 but shows the vehicle subjected to an impact from the left.
Figure 3:
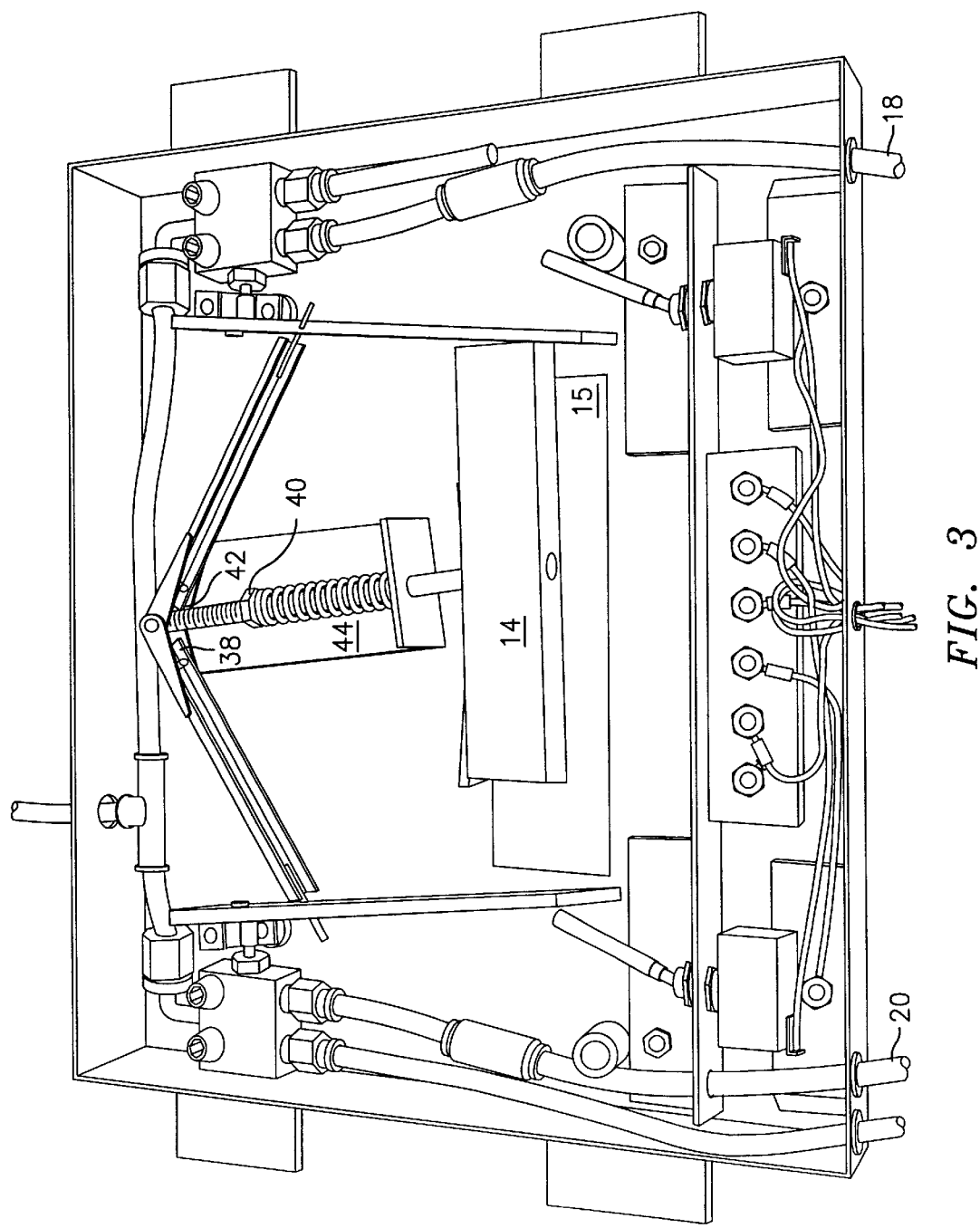
FIG. 3 is a view similar to FIG. 2 but showing the results of an impact from the right side.
Figure 4:
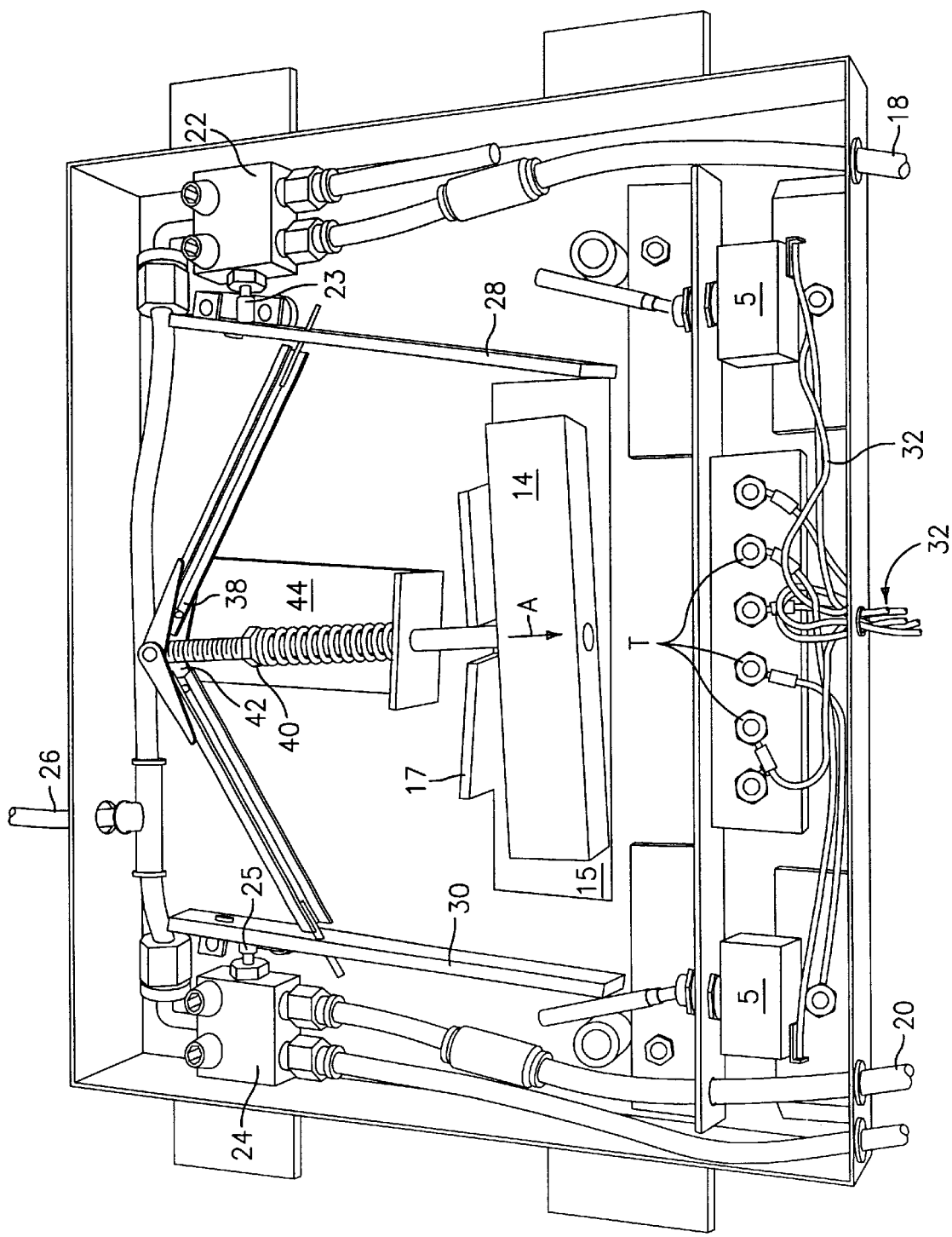
FIG. 4 is a view similar to FIGS. 1, 2, & 3 but showing the results of an impact having a component from the right side, but having a component on the vehicle centerline from a head-on impact.

More particularly, the mass or block 14 is slideably supported on a horizontal surface 15 defined for this purpose in the housing, and is held in its rest position on shaft 12 as a result of the action of coil compression spring 16, and a concave saddle 17 defined for this purpose for centering the shaft 12 on the longitudinal centerline of the housing and of the vehicle in which it sits. This rest condition for the rectangular block or mass 14 is shown to best advantage in FIG. 1. FIGS. 2 and 3 show the mass 14 displaced from its rest position as a result of a side impact which causes a corresponding inertial reaction and change in position of the mass 14. In these situations, the block or mass 14 has engaged one of the levers 28 or 30 thereby pivoting the lever 28, or 30 on the fulcrum provided at the free end of a wing portion 38 associated with a nut to which the wing is attached. Two nuts are threadably received on the threaded portion of the shaft 12. A first nut 40 on the shaft 12 engages one end of the coiled compression spring 16, and the second nut 42 is provided in spaced relation on the threaded shaft 12 from the first nut 13, and serves to pivotally support the wing portion 38. As so constructed and arranged, movement of the mass 14 in the longitudinal direction due to an impact from a head-on collision will cause the block 14 to be displaced downwardly as shown in FIG. 4. In FIG. 4 the mass 14 is also shifted laterally spreading the wing portion 38 moving lever 28 outwardly closing at least one of the two valves and opening both electrical switches as shown in FIG. 4.

In further accordance with present invention, the inertia responsive mass 14 is sensitive not only to impact in the longitudinal direction, but also to impact with a component in the lateral direction. Where a spring force from the spring 16 must be overcome to achieve motion of the mass 14 in the longitudinal direction, movement of the mass 14 in either lateral direction is more readily achieved. Merely overcoming whatever gravity forces act on this block 14 due to the mounting of the shaft 12 in its saddle 17. The saddle 17 is of concave configuration restricting sliding movement of the shaft. However, the mass overcomes the downward force of gravity tending to keep the shaft 12 positioned as shown in FIG. 4 when a lateral impact force occurs.

In order to provide for and accommodate this lateral swinging motion of the shaft 12, and of the weight 14 relative to the surface of the saddle 17 the spring 16 acts against an abutment surface defined by bracket 44 pivotally mounted in the housing H at 35. The bracket 44 includes a flange 44a that engages one end of the spring 16. The other end of the spring 16 acts on the nut 40 mentioned previously. This arrangement allows swinging movement of the mass 14 and the shaft 12 in response to impacts directed laterally of the vehicle and hence laterally of the housing which is mounted in the vehicle.

It will be apparent that other variations of the invention will occur to those skilled in the art. Although the present invention is described with reference to a fuel system of the type described in my prior patent 5,738,304, the pressure from a source of gas being relied upon to operate the valves, direct activation of on/off valves in a continuous fuel line fed through the housing might also be provided for use in the automotive field. The present invention is, however, described with reference to my prior art patents which are not only incorporated by reference herein, but which serve to offer greater safety in the form of explosion proof tanks and fuel shut off valves associated with these tanks. The shut off valves are operated from a source of gas under pressure and therefor the valves in the invention as described are also of this type.

Thus, the invention is described in detail with reference to a particular embodiment, but other variations will occur to those skilled in the art from the foregoing description. Therefore, the protection granted is to be limited only within the spirit of the invention and the scope of the following claims, as dictated by the doctrine of equivalents.

What is claimed is:

1. In a vehicle having fuel lines for delivering ignitable fuel to an engine, and having an electrical system with at least one branch circuit that includes wiring provided in close proximity to these fuel lines and/or to the engine, the improvement comprising:

a control housing having electrical connections for the vehicle's electrical system and fuel inlet and outlet connections for the vehicles fuel lines, electrical switches provided in said housing for normally closing the electrical system, said switches provided in electrical series with one another so that activating any one of said switches disables the electrical system, fuel valves provided in said housing for normally allowing fuel to flow through the fuel lines, said valves provided in series with one another so that activating any one of said valves interrupts fuel flow in the vehicle fuel lines, and bi-directional inertia responsive means for activating said switches and valves, said inertia responsive means including a mass, and means biasing said mass in a primary longitudinal direction such that an impact force with a component of predetermined magnitude that is opposite said one direction overcomes said biasing force and activates at least one electrical switch and at least one valve, said mass being lightly biased in both lateral directions transversely of said primary longitudinal direction such that a lesser lateral component of any impact force in a lateral direction is required to activate at least one electrical switch and at least one valve.

2. The improvement of claim 1 wherein said inertia responsive means further comprises a threaded shaft oriented in said longitudinal direction, said biasing means comprising a coiled compression spring acting between said shaft and an abutment provided in said housing, said abutment allowing said shaft to swing said inertial mass laterally in response to an impact force component in said lateral direction that exceeds said lesser lateral component.

3. The improvement of claim 2 wherein said threaded shaft carries a threaded nut to allow adjustments in said coil spring biasing force acting between said housing abutment and said nut.

4. The improvement of claim 3 wherein said threaded shaft carries a second threaded nut having pivoted wing portions, and levers connected to said wing portions, said levers being engageable by said inertial mass to activate said valves and engageable with said valves to activate said valves.

5. The improvement of claim 4 wherein said valves are normally held open by gas pressure from a source of gas pressure, said valves having mechanically activated plungers movable from said open to closed positions wherein the gas pressure is overridden by said lever action from said inertial mass movement.

6. The improvement of claim 5 wherein said mass is slidably supported on a horizontal surface provided for it on said housing, said housing having a raised concave guide surface for engaging said shaft to provide gravity biasing to lightly bias said mass and shaft in the lateral directions generally toward said primary longitudinal directions.

7. The improvement of claim 6 wherein said switches are mechanically activated bat switches of the two position (on/off) type, each of said levers having one and an opposed end portions, said one end portion engageable with one of said switches, and said opposed end portion engageable with one of said valve plungers.

* * * * *